UNITED STATES PATENT OFFICE.

ALMER McDUFFIE McAFEE, OF NEW YORK, N. Y., ASSIGNOR TO GULF REFINING COMPANY, OF PITTSBURGH, PENNSYLVANIA, A CORPORATION OF TEXAS.

UTILIZATION OF ALUMINUM-CHLORID RESIDUES.

1,206,874. Specification of Letters Patent. Patented Dec. 5, 1916.

No Drawing. Application filed March 2, 1915. Serial No. 11,549.

*To all whom it may concern:*

Be it known that I, ALMER MCDUFFIE MCAFEE, a citizen of the United States, residing at New York, in the county of New York and State of New York, have invented certain new and useful Improvements in Utilization of Aluminum-Chlorid Residues, of which the following is a specification.

This invention relates to the utilization of aluminum chlorid residues; and it comprises a method of utilizing coky and sludgy residues arising from the treatment of oils with anhydrous aluminum chlorid and still containing aluminum chlorid in more or less inactive state wherein said sludgy or coky residues are supplied to a fused electrolytic bath and electrolyzed therein, a further portion of said residues being burnt with a limited supply of air to recover aluminum chlorid and also alumina, such alumina or other oxidizing agent being supplied to said bath to remove the excess of carbon therefrom; all as more fully hereinafter set forth and as claimed.

Aluminum chlorid has proved to be a useful catalytic agent in the refining and conversion of mineral oils; it being possible for example by its use to convert low grade lubricating oils containing unsaturated hydrocarbons and asphaltic constituents into light colored, permanent, saturated lubricating oils of high quality. In other uses of aluminum chlorid it is employed to convert high boiling oils such as gas oil, solar oil, crude petroleum oil, etc., into gasolene or gasolene and kerosene with a total or partial conversion. With a partial conversion crude petroleum may be converted partly into gasolene and partly into residual high boiling oil of high quality. In any of these methods the catalytic activity of the aluminum chlorid is not permanent; after a time it loses its catalytic activity and occurs in a coky or sludgy deposit. This residue may contain 30 or more per cent. of aluminum chlorid, but the aluminum chlorid is apparently fixed in some manner so that it does not display its ordinary reactions. The coky material may be heated to a red heat without substantial vaporization of aluminum chlorid although aluminum chlorid by itself volatilizes at 365°F. In the present invention I have devised a method of utilizing the aluminum chlorid contained in these residual products. Being high in aluminum chlorid, these residua if supplied to an electrolytic furnace, may be readily electrolyzed to furnish aluminum and chlorin which may be used as such, or may be reünited to form active aluminum chlorid by well known methods.

As the residues come from or occur in the oil converting process they are commonly permeated with oil. Where the coke or sludge has been allowed to cool with a mass of oil, this oil may be present in rather large amounts; say, 40 to 50 per cent. If separated from a hot oil mass and allowed to drain well, and particularly if vacuum draining has been employed, the amount of oil remaining may be say, only from 4 to 5 per cent. I ordinarily first extract or remove this oil. It may be extracted with gasolene or other oil solvents. If the amount of oil is large much may be removed by pressing. If the amount of oil is small it may simply be burned off.

In speaking hereafter of the treatment of these residues I wish it to be understood that I am referring mainly to the oil freed residues; the oil having been substantially removed in any of the ways just stated. In this connection it may be noted that it is not safe to allow these residues, either before or after the oil extraction, to remain exposed to the air since the aluminum chlorid is quite deliquescent and the mass becomes wet or moist, injuring it for the processes hereinafter set forth.

While as stated the mass may be heated far above the ordinary volatilizing temperature of aluminum chlorid without loss of that material, I find that by roasting in the presence of a limited current of air I can obtain some or most of the aluminum chlorid as such. As stated, the condition in which the aluminum chlorid exists in the coky mass is not known—it may be simply absorbed or it may exist in a state of combination with pitchy hydrocarbons. But at all events if the residue be heated in presence of a limited amount of air the excess of carbon present may be burned away without materially affecting the aluminum chlorid; and as the carbon vanishes, this aluminum chlorid volatilizes forming vapors which may be condensed in any suitable way.

If the amount of air be increased, the residue will be largely alumina, the carbon burning out and the chlorin (in combination with hydrogen which is always present) going forward as hydrochloric acid. Ordinarily in conducting this roasting operation I produce some aluminum chlorid and some alumina. The aluminum chlorid may be recovered as such and reused. The alumina I collect and use as hereinafter set forth.

On adding the coky residues to a fused bath of cryolite or common salt and electrolyzing, aluminum goes to the cathode and the chlorin to the anode in the usual manner. But as the material contains much carbon it is necessary to remove this carbon in some way to keep the bath in working condition. This may be done by feeding air into or over the fused bath, thereby burning away the carbon and freeing the aluminum chlorid which is taken up by the electrolyte. But a better way of operating is to add the oxygen in the form of alumina; this alumina coming from the hereinbefore described roasting combustion of coky residue. For example, a fused electrolytic bath of cryolite or common salt may be established and maintained in the usual manner; and to this bath may be fed a mixture of alumina and of coky residue. The alumina reacts with the carbon of the residue, giving aluminum at the cathode while the contained aluminum chlorid of the coky residue is also electrolyzed likewise giving aluminum; or the described oil-freed coky residue may be directly added to the electrolyzing bath, a small amount of air being fed into or over the bath at the same time. It is however better to use alumina in lieu of air.

In a specific embodiment of the present invention, I may take one of the described coky residues and remove the oil in any of the described ways. A portion of this oil-freed coky residue may now be burnt in a retort-like vessel with a limited access of air. In part aluminum chlorid will be volatilized as the carbon burns away, and will go forward as vapor which may be condensed in any convenient manner. The residue in the retort will be alumina. The proportion of the aluminum recovered as aluminum chlorid and as alumina will depend upon the condition existing in the retort and the amount of air supplied. If the coky residue comes from the treatment of an oil containing oxygen or traces of moisture, it may in any event contain some preformed alumina which will be recovered after this roasting combustion.

Another portion of the coky residue is supplied to an electrolytic bath containing cryolite or salt and of the usual type. As it is taken up by the fused bath the contained aluminum chlorid will be dissolved out and will electrolyze in the manner described, furnishing chlorin and metallic aluminum. The chlorin may be collected and reunited later with the aluminum. Simultaneously with the supply of coky residue, I may add alumina made in the manner hereinbefore described; or the alumina and coky residue may be added alternately and in proportions such as to maintain a carbon-free bath. The carbon of the residue is oxidized at the expense of the alumina, giving metallic aluminum and carbon oxids.

What I claim is:—

1. In the utilization of coky residues from oil refining containing aluminum chlorid, the process which comprises roasting a portion of said residues with limited access of air to form alumina, adding said alumina and a further portion of said coky residue to an electrolyzing bath and electrolyzing to produce aluminum.

2. In the utilization of coky residues from oil refining containing aluminum chlorid, the process which comprises electrolyzing said coky residues in a fused bath to produce metallic aluminum.

3. In the utilization of coky residues from oil refining containing aluminum chlorid, the process which comprises electrolyzing said coky residues in a fused bath in the presence of an oxidant in such manner as to produce metallic aluminum.

4. In the utilization of coky residues from oil refining containing aluminum chlorid, the process which comprises electrolyzing such coky residues in a fused bath with additions of alumina in amount sufficient to oxidize the carbon of said residues.

5. In the utilization of coky residues from oil refining containing aluminum chlorid, the process which comprises roasting said coky residues in the presence of a limited amount of air to produce aluminum chlorid and alumina, recovering said alumina and electrolyzing the same in a fused bath.

6. In the utilization of coky residues from oil refining containing aluminum chlorid, the process which comprises roasting said coky residues in the presence of a limited amount of air to produce aluminum chlorid and alumina, the amount of air and of moisture carried thereby being insufficient to produce substantial change in said aluminum chlorid while sufficient to remove substantially all the carbon.

In testimony whereof, I affix my signature in the presence of two subscribing witnesses.

ALMER McDUFFIE McAFEE.

Witnesses:
K. P. McELROY,
GEORGE G. McDANIEL.